(12) United States Patent
Rozman et al.

(10) Patent No.: US 8,080,960 B2
(45) Date of Patent: Dec. 20, 2011

(54) DIRECT FLUX REGULATED PERMANENT MAGNET BRUSHLESS MOTOR UTILIZING SENSORLESS CONTROL BY DC AND AC EXCITATION

(75) Inventors: Gregory I. Rozman, Rockford, IL (US); Jacek F. Gieras, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 621 days.

(21) Appl. No.: 12/194,747

(22) Filed: Aug. 20, 2008

(65) Prior Publication Data

US 2010/0045222 A1  Feb. 25, 2010

(51) Int. Cl.
*H02P 6/16* (2006.01)

(52) U.S. Cl. ............ 318/400.33; 318/400.32; 310/68 B

(58) Field of Classification Search ............. 318/400.32, 318/400.33, 400.34, 400.36; 310/66, 68 R, 310/68 B
See application file for complete search history.

(56) References Cited

U.S. PATENT DOCUMENTS

| | | | |
|---|---|---|---|
| 3,518,517 A * | 6/1970 | Rainer | 318/400.09 |
| 3,617,841 A * | 11/1971 | Brailsford | 318/400.05 |
| 4,065,706 A * | 12/1977 | Gosling et al. | 318/400.11 |
| 4,158,795 A * | 6/1979 | Tarumi et al. | 318/400.09 |
| 4,617,499 A * | 10/1986 | Yuasa | 318/400.01 |
| 4,687,961 A | 8/1987 | Horber | |
| 5,329,195 A | 7/1994 | Horber | |
| 5,363,032 A | 11/1994 | Hanson | |
| 5,650,706 A | 7/1997 | Yamada | |
| 6,515,395 B1 | 2/2003 | Jansen | |
| 6,965,183 B2 | 11/2005 | Dooley | |
| 7,215,059 B1 | 5/2007 | Bitsche | |
| 7,218,021 B2 | 5/2007 | Nilson | |
| 7,304,446 B2 | 12/2007 | Wang et al. | |
| 7,508,154 B1 * | 3/2009 | Labriola, II | 318/602 |

OTHER PUBLICATIONS

U.S. Appl. No. 12/061,309, filed Apr. 2, 2008.
U.S. Appl. No. 12/061,346, filed Apr. 2, 2008.
U.S. Appl. No. 12/100,452, filed Apr. 10, 2008.

* cited by examiner

*Primary Examiner* — Bentsu Ro
(74) *Attorney, Agent, or Firm* — Carlson, Gaskey & Olds, PC

(57) ABSTRACT

A flux regulated permanent magnet brushless motor has a stator having an inner peripheral bore. A permanent magnet rotor is mounted within the inner peripheral bore. A control winding is supplied to a DC current to regulate flux of the machine. A small AC current is also supplied and an output is sensed to determine a position of the permanent magnet rotor.

11 Claims, 3 Drawing Sheets

DIRECT FLUX REGULATED PERMANENT MAGNET BRUSHLESS MOTOR UTILIZING SENSORLESS CONTROL BY DC AND AC EXCITATION

BACKGROUND OF THE INVENTION

This application relates to a permanent magnet flux regulated motor, wherein no sensor is necessary to provide position feedback of the location of the rotor.

In the field of electric motors, permanent magnet motors are known, as are motors utilizing coils for their rotors. Recently, a permanent magnet brushless motor design has been developed, which uses direct flux regulation to provide better control. The stator may include slots which are closed by ferromagnetic wedges. The wedges are provided with control coils fed with current. By controlling the current through the control coils, the overall magnetic flux can be controlled.

To use the overall control of magnetic flux, precise position feedback for the permanent magnet rotor is required. A sensor could be provided; however, a sensor would add to the cost and weight.

Various sensorless control techniques are known, such as detection of back EMF, detection of the stator third harmonic voltage, and detection of the conducting interval of freewheeling diodes connected in antiparallel with solid state switches.

Another method of sensorless control is to sense the inductance variation along the quadrature and direct axes, known as the d and q axes. The direct axis is the center axis of the poles of the permanent magnets, while the quadrature axis is shifted by 45°. Co-pending application Ser. No. 12/100,452, filed Apr. 10, 2008 and entitled Direct Flux Regulated Permanent Magnet Brushless Motor Utilizing Sensorless Control discloses such a method.

SUMMARY OF THE INVENTION

A flux regulated permanent magnet brushless motor has a stator having an inner peripheral bore. A permanent magnet rotor is mounted within the inner peripheral bore. A control winding is supplied to a DC current to regulate flux of the machine. A small AC current is also supplied and an output is sensed to determine a position of the permanent magnet rotor.

These and other features of the present invention can be best understood from the following specification and drawings, the following of which is a brief description.

DETAILED DESCRIPTION OF THE PREFERRED EMBODIMENT

Figure 1:
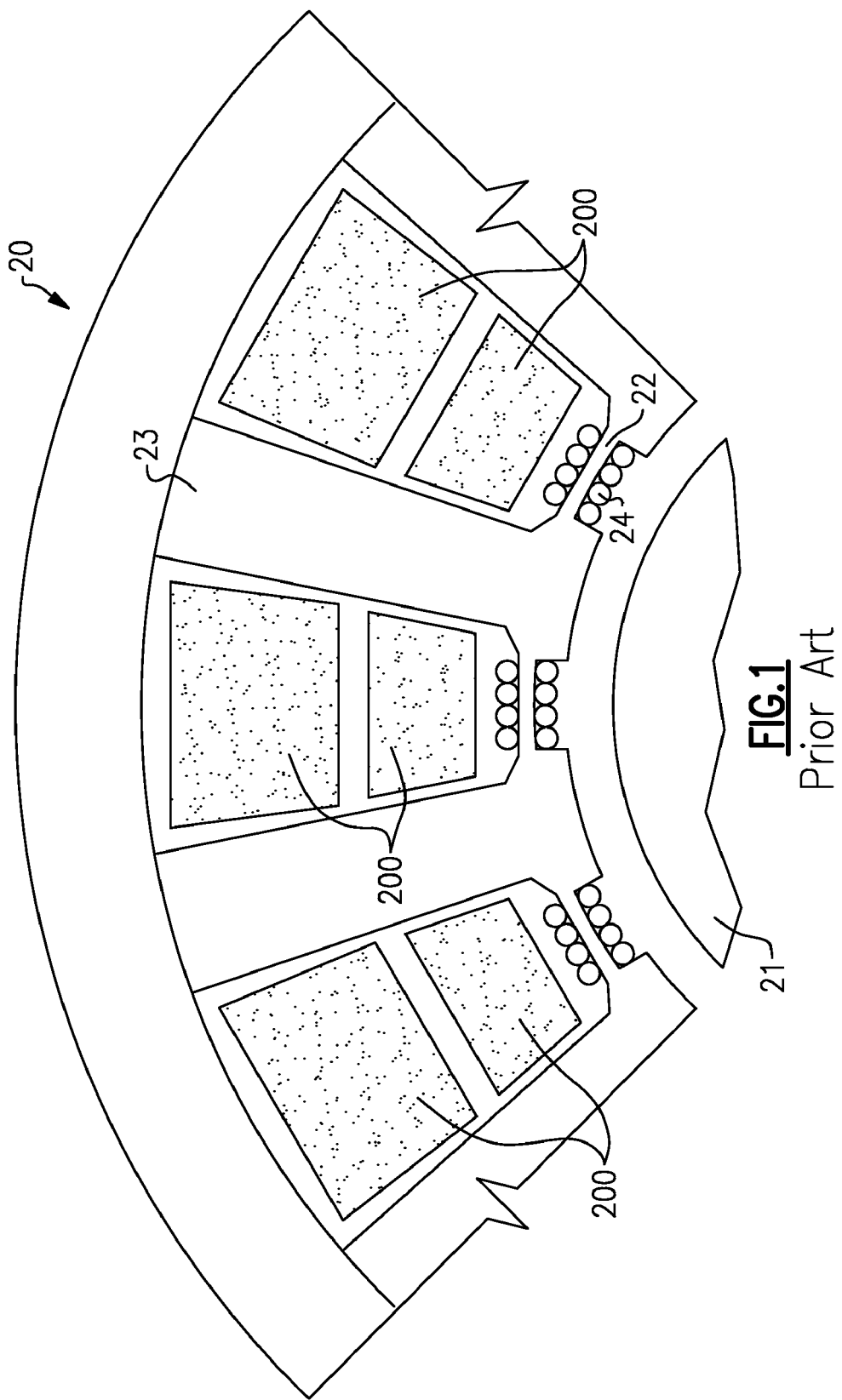
FIG. 1 is a partial cross-sectional view through a stator of a known motor.

As shown in FIG. 1, in a known permanent magnet brushless motor, direct regulation of the magnetic flux is provided. A rotor 21, shown as a cutaway in FIG. 1, is a permanent magnetic rotor, and the stator 20 is slotted. Stator slots are provided with stator coils 200. The electromagnetic wedges 22 are provided with control coils 24. The control coils may receive a DC or an AC current. The coils 24 may be connected in series to create a control winding. In a disclosed embodiment of this invention, the control coils receive a DC current.

The electromagnetic wedges 22 behave as shunts for a magnetic flux produced by the permanent magnet motor. If the reluctance of the wedges is low, a portion of the magnetic flux is shunted by the wedges. FIG. 1 shows a stator with double layer AC winding 200 distributed in slots closed with wedges 22 (magnetic flux diverters). The stator AC winding 200 can also be made as a single layer winding. Stator teeth 23 are positioned between the slots with AC windings 200.

The wedges 22 may be made of laminated ferromagnetic alloys or sintered magnetic powders. The magnetic wedges with the control coils can be inserted directly into conventional stator slots. Instead of round conductors (FIG. 3A), the control coils 24 can also be wound with rectangular conductors or foil conductors (FIG. 3B). Alternatively, slot wedges can be stamped together with the stator teeth and after inserting the stator windings into the slots, a wound star-shaped stator core can be pressed into a ring-shaped stator ferromagnetic yoke.

The reluctance of a ferromagnetic material is inversely proportional to its magnetic permeability. If the control current in the control coils 24 is zero, the reluctance of the magnetic shunt provided by the wedges 22 is low because their magnetic permeability is high. Almost the total air gap magnetic flux produced by the permanent magnets will pass through the slot wedges.

Conversely, when the control current is greater than zero, the slot wedges 22 partially saturate and their magnetic permeability decreases. Their reluctance increases and only a portion of the magnetic flux is shunted by the wedges.

As the magnetic flux linked with the stator windings increases, so does the back EMF induced in the stator windings and the electromagnetic torque. Thus, by controlling the control current, the electromagnetic torque can be controlled as well as the EMF.

Increasing the control current further increases the slot wedge reluctance and its relative magnetic permeability approaches unity. A fully saturated slot wedge behaves as a free space. Almost the whole air gap magnetic flux excited by the rotor permanent magnets will penetrate through the stator teeth and yoke and excites a maximum EMF in the stator winding 200, and also a maximum electromagnetic torque.

The rotor magnetic flux can induce some AC voltage in the control winding. This voltage can be cancelled by connecting the same terminals (i.e., beginning with beginning and end with end of neighboring shunt coils). Such connection can typically only be done with DC control current.

To properly operate the proposed machines as set forth above, precise position feedback of the rotor is necessary.

Figure 2:
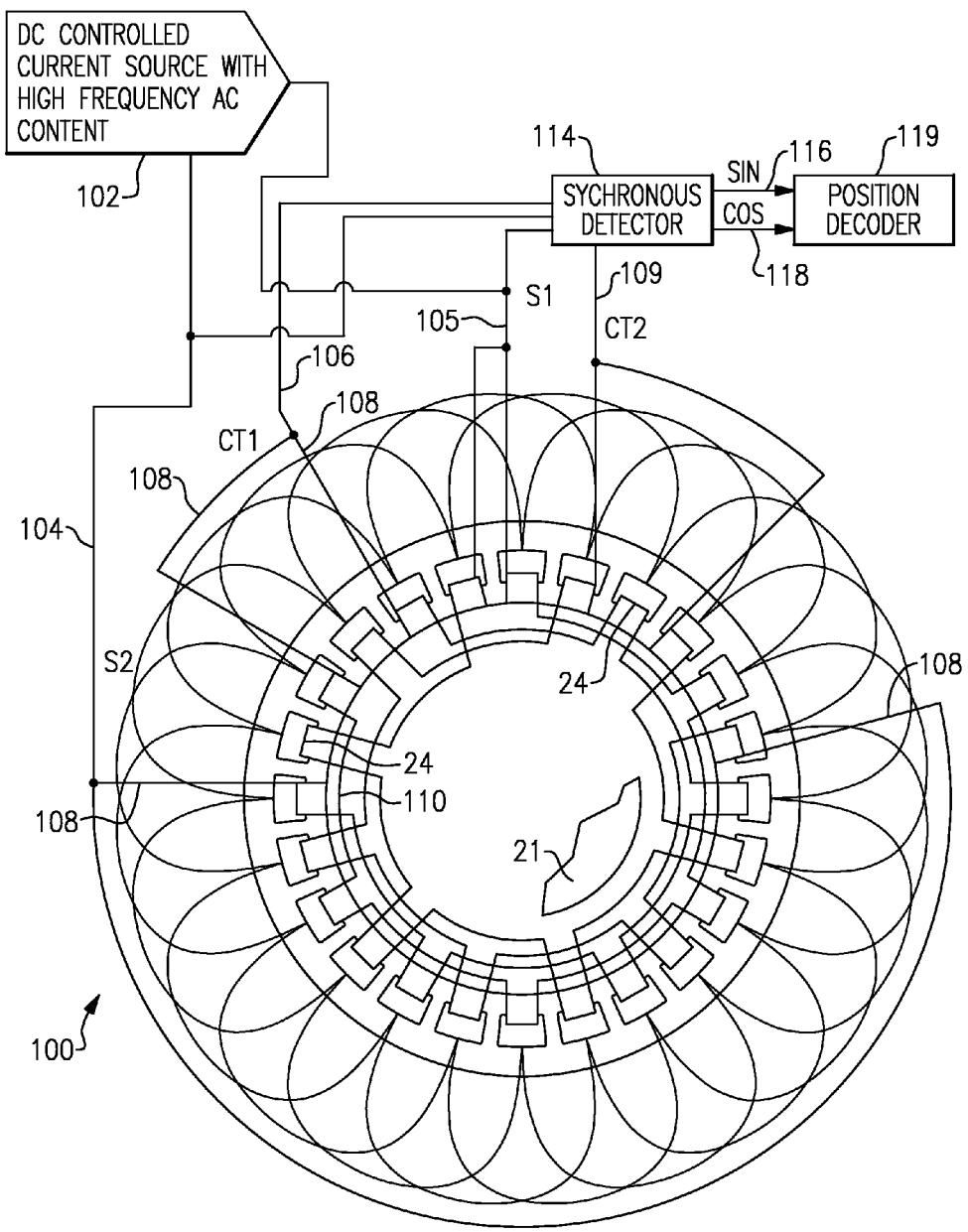
FIG. 2 shows a control circuitry that is added onto the motor stator of FIG. 1.

FIG. 2 shows an AC control circuit 100 that with the stator control coils 24 illustrated in FIG. 1 provides position feedback. Only some of the control coils 24 are numbered, but it should be understood each of the other locations illustrates a similar coil 24. A DC controlled current source 102 supplies the DC current to the control coils 24 as mentioned above.

In addition, a high frequency AC current is added. As an example, a 100 kHz oscillation can be applied to the control coils. As illustrated, the source 102 supplies the current through connections 104 (terminal S2), 105 (terminal S1) and to branch lines 108 to separate sets of the coils 24. Stator control coils 24 are in turn connected by jumper lines 110 such that there are distinct sets of stator control coils 24 associated with each of the four branch lines 108. As illustrated, there are equal numbers of coils in each of the sets. Connections 106 (terminal CT1) and 109 (terminal CT2)

communicate back to a synchronous detector 114. The magnitude of the AC signals at the terminals CT1 and CT2 varies as a function of the rotor magnets position. The synchronous detector 114 provides selection of these signals and delivers both a cosine 118 and sine 116 signals as a function of rotor angle. These quadrature components of the rotating vector are processed by a position decoder 119. The sine and cosine function provide the position detector 119 with the ability to detect the position of the permanent magnet rotor 21 (again shown in cutaway in FIG. 2) relative to the stator.

This invention thus provides sensorless operation and precise feedback on the exact position of the rotor. As shown in FIG. 2, the control coils 24 are connected in series into their four groups. That is, supply line 105 communicates with two groups and supply line 104 communicates with two groups, each through branch line 108. Of course, other numbers of groups and other numbers of coils within each group would come within the scope of this invention.

Control coils of this embodiment do not require any special shape for the stator core, and need not be wound on salient poles. Instead, the control coils can be simply wound on a ferromagnetic wedge and inserted into stator slots.

The control signal is low, and in the range of mA, and the cross-section of the control coil conductors can be small also. Thus, the stator slot space occupied by the armature winding is not reduced significantly. Further, the present disclosed embodiment will enable position detection either with or without the applied DC excitation, e.g., during a windmilling engine start.

Figure 3A:
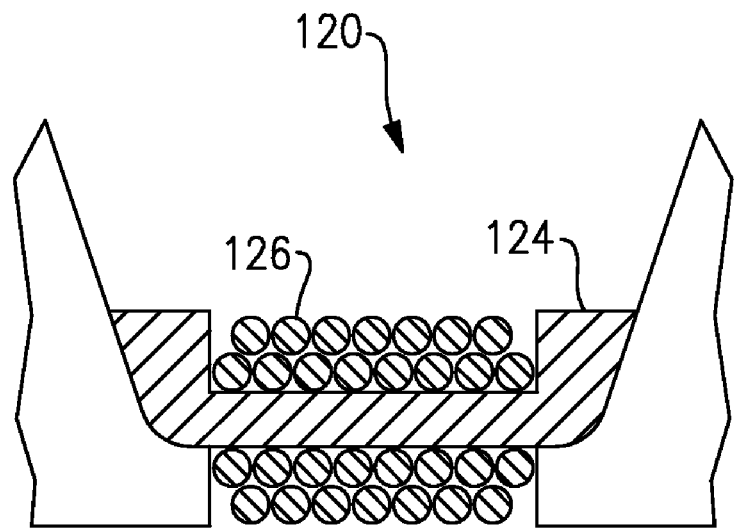
FIG. 3A shows a first control coil.
Figure 3B:
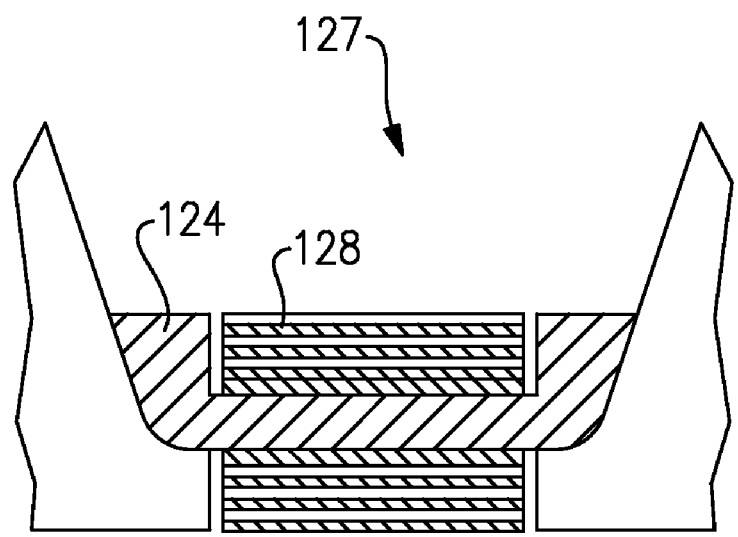
FIG. 3B shows a second control coil.

As shown in FIG. 3A, in one embodiment 120, the control coil 126 wrapped around the wedge 124 can be round wire. As another alternative, FIG. 3B shows an embodiment 127 wherein foil ribbon 128 is utilized for the control coil.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A flux regulated permanent magnet brushless motor comprising:
    a stator having an inner peripheral bore and having stator windings;
    a permanent magnet rotor mounted within said inner peripheral bore;
    a control coil to regulate flux of the motor at the stator windings;
        wherein a control current is supplied to the control coil, and a small AC current is also supplied to the control coil and a responsive signal is detected to determine a position of the permanent magnet rotor; and
    said stator is a hybrid-type stator with radially outer stator windings, and said control coils being radial inner control coils, with said control coils being provided with variable control and AC currents.

2. The motor as set forth in claim 1, wherein a power source connects the AC current to sets of said control coils.

3. The motor as set forth in claim 2, wherein there are an equal number of control coils in each of said sets.

4. The motor as set forth in claim 1, wherein said control current is a DC current.

5. The motor as set forth in claim 1, wherein said position may be detected even when no control current is being supplied to the control coil.

6. The motor as set forth in claim 1, wherein said responsive signal is an AC signal.

7. A flux regulated permanent magnet brushless motor comprising:
    a stator having an inner peripheral bore and having stator windings;
    a permanent magnet rotor mounted within said inner peripheral bore;
    a control coil to regulate flux of the motor at the stator windings;
    a control current is supplied to the control coil, and a small AC current is also supplied to the control coil and a responsive signal is detected to determine a position of the permanent magnet rotor; and
    the responsive signal comes from a pair of connections connected to a synchronous detector.

8. The motor as set forth in claim 7, wherein said stator is a hybrid-type stator with radial outer stator windings, and said control coils being radial inner control coils, with said control coils being provided with variable control and AC currents.

9. A flux regulated permanent magnet brushless motor comprising:
    a stator having an inner peripheral bore;
    a permanent magnet rotor mounted within said inner peripheral bore;
    a control coil to regulate flux of the motor;
    wherein a DC current is supplied to the control coil, and a small AC current is also supplied and a responsive signal is detected to determine a position of the permanent magnet rotor;
    the responsive signal coming from a pair of connections connected to a synchronous detector; and
    said synchronous detector supplies both a sine and a cosine signal to a position decoder, and said position decoder in turn determines the rotor position.

10. A flux regulated permanent magnet brushless motor comprising:
    a stator having an inner peripheral bore;
    a permanent magnet rotor mounted within said inner peripheral bore;
    a control coil to regulate flux of the motor;
    a DC current supplied to the control coil, and a small AC current also supplied and a responsive signal sent from a pair of connections connected to a synchronous detector to determine a position of the permanent magnet rotor;
    a power source connecting the AC current to sets of said control coils, an equal number of control coils in each of said sets; and
    said synchronous detector supplying both a sine and a cosine signal to a position decoder, and said position decoder in turn determines the rotor position.

11. The motor as set forth in claim 10, wherein said stator is a hybrid-type stator with radial outer stator windings, and said control coil being radial inner control coils, with said control coils being provided with the DC and AC currents which may be varied.

* * * * *